Sept. 17, 1968   W. B. McCAIN ET AL   3,401,809
BOOK HANDLING APPARATUS
Filed Oct. 20, 1965   9 Sheets-Sheet 1

Inventors
William B. McCain
James F. Cosgrove
Ronald W. Weller
By Wallace, Kinzer and Dorn
Attorneys Sept. 17, 1968    W. B. McCAIN ET AL    3,401,809
BOOK HANDLING APPARATUS
Filed Oct. 20, 1965    9 Sheets-Sheet 3

Inventors
William B. McCain
James F. Cosgrove
Ronald W. Weller
By Wallace, Kinzer and Dorn
Attorneys Sept. 17, 1968  W. B. McCAIN ET AL  3,401,809
BOOK HANDLING APPARATUS Filed Oct. 20, 1965  9 Sheets-Sheet 8

Inventors
William B. McCain
James F. Cosgrove
Ronald W. Weller
By Wallace, Kinzer and Dorn
Attorneys Sept. 17, 1968    W. B. McCAIN ET AL    3,401,809
BOOK HANDLING APPARATUS
Filed Oct. 20, 1965    9 Sheets-Sheet 9

Inventors
William B. McCain
James F. Cosgrove
Ronald W. Weller
By Wallace, Kinzer and Dorn
Attorneys

United States Patent Office 3,401,809
Patented Sept. 17, 1968

3,401,809
BOOK HANDLING APPARATUS
William B. McCain, Hinsdale, James F. Cosgrove, Western Springs, and Ronald W. Weller, Chicago, Ill., assignors to Chicago Machinery Laboratory, Inc., Chicago, Ill., a corporation of Illinois
Filed Oct. 20, 1965, Ser. No. 498,894
8 Claims. (Cl. 214—6)

ABSTRACT OF THE DISCLOSURE

Signatures and the like are pressed while being stacked to produce a generally flat or level stack, and after a stack of predetermined nature has been achieved the stack is transferred to another station. This may be accomplished while registering the signatures to assure alignment during stacking, and in order that the stack will not be disturbed means are afforded to assure that transfer takes place at a rate slower than delivery of the signatures during stacking. Also at the time of transfer, the register means is displaced, the presser means is disabled, and a temporary support is presented to enable a new stack to be started.

---

This invention relates to a method of and apparatus for stacking a plurality of articles such as magazines, pamphlets, signatures, envelopes or the like.

It is often desired to form books, envelopes or the like into neat stacks to facilitate mailing or subsequent handling of such articles. Thus, where an address is common to a series of such articles in a stack, a sensing means may be employed to detect a change in address to institute formation of a different stack. In stacking machines for books it is common practice to arrange the stacks according to a predetermined count or number of books so that each of the stacks has the same number of books therein. The primary object of the present invention is a new and improved method of and apparatus for stacking articles into neat stacks in a stacking station.

The problem of aligning books or the like in a neat and square stack in a stacking machine and removing the stack while maintaining neat alignment is aggravated by the general nature of the magazine type of book which has an expanded, thick backbone, a thin center cross-sectional thickness and a front cut cross-sectional thickness which is larger than the center cross-sectional thickness. Such a stack has a greater height at the backbone edge; and, after accumulating a stack of such books, the top books are canted relative to the horizontal. This canting of topmost books is more severe when the magazines or books have been previously conveyed along a saddle type conveyor wherein the backbones are expanded. Also, where the books have a relatively slick cover surface, the books have a tendency to slide, relative to one another and disrupt the stack. Accordingly, an object of the present invention is to overcome the aforementioned difficulties to achieve a neat and squared stack and to remove the stack from the stacking station with a minimum of disturbance of the stack from its squared and neat condition.

Commercially acceptable stackers receive the books at a relatively high incoming speed over conveyor means which affords a relatively continuous but steady stream of spaced books. For a number of reasons, it is undesirable to stop the conveying of the incoming books into the stacking station of the stacking machine. Although the books are traveling at a relatively high velocity into the stacking station, it is not desired to remove the stack at such a high rate of speed, or at a higher rate of speed as between arrival of incoming books, as this high speed stack removal would disturb the neatness and squareness of the already stacked books. Accordingly, a further object of the invention is to remove the stack at relatively slow speed compared with the speed of the books incoming into the stacking machine. A further object of the invention is to accumulate the incoming stream of books on temporary supports within the stacking station while the stack is being slowly removed from the stacking station thereby providing a relatively continuous operation of the stacker machine.

As explained hereinbefore, the incoming books in the stacking machine often have the backbone thereof in an expanded state and have a considerable amount of air in between the pages thereof. A further object of the invention is to form a neater and smaller stack of books by pressing the books during the stacking operation to remove the air from the books and to flatten the books. Another object of the invention is to eliminate free fall of a stack of books by having a support for the lowermost book in the stack disposed at the level of the lowermost book of the stack. Thus, the stack of books is removed with relatively little disturbance.

Another object of the invention is to remove the stack of books from the stacking station by a continuous conveyor mechanism.

A further object of the invention is to prevent disarrangement of the stack by inclining the stack conveyor mechanism at an angle to the horizontal to compensate for the inclination of the upper books on the stack being removed.

The stacker has the capability of handling various kinds of signatures or books which differ in thickness, width and length; and this constitutes a further object of the invention. More specifically, a further object of the invention is to adjust the height of conveyor support table so that count or thickness of the stack may be varied while maintaining the conveyor support table disposed at the level adjacent the lowermost book when the stack has been completed.

A further object of the invention is to handle plural streams of incoming books, to stack the streams of books in separate stacks and to simultaneously remove said stacks from said stacking station.

In the preferred embodiment of the invention, a plurality of books are superimposed one on another and are counted as they are delivered to the stacking station. In order to assure that a correct count has been made, a detecting device is provided to measure the thickness of the superimposed books to assure that the proper number of books are superimposed on one another. A further object of the invention is to detect the occurrence of an improper thickness of books coming into the stacking station and to direct the faulty book or books from the stacking station without interruption of the conveying mechanism leading to the stacking station. More specifically, it is a further object of the invention to provide a pivoted deflecting gate which is selectively operable to an operative position upon the detection of an inaccurate thickness of books to deflect the book or books to a point outside of the stacking station.

Other and further object of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be used and structural changes may be made as described by those skilled in the art without departing from the present invention and the purview of the appended claims.

*General Description*

Figure 1:
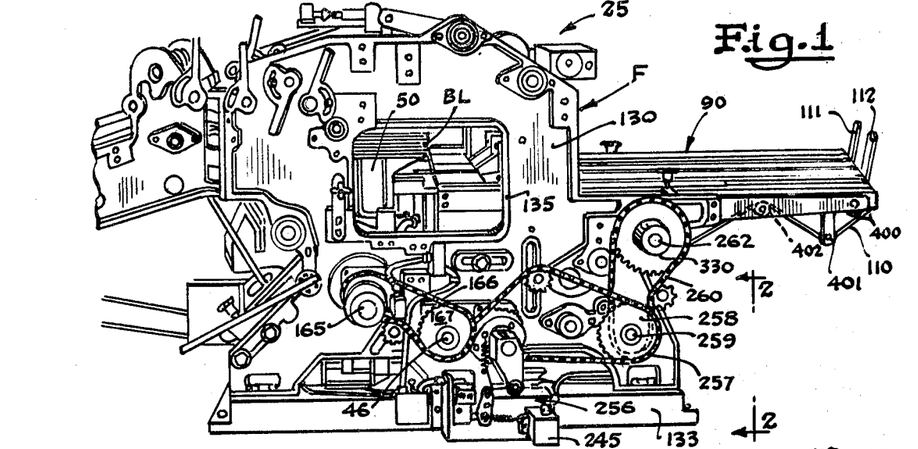
FIG. 1 is a perspective view of a stacking machine constructed in accordance with the preferred embodiment of the invention.
Figure 4:
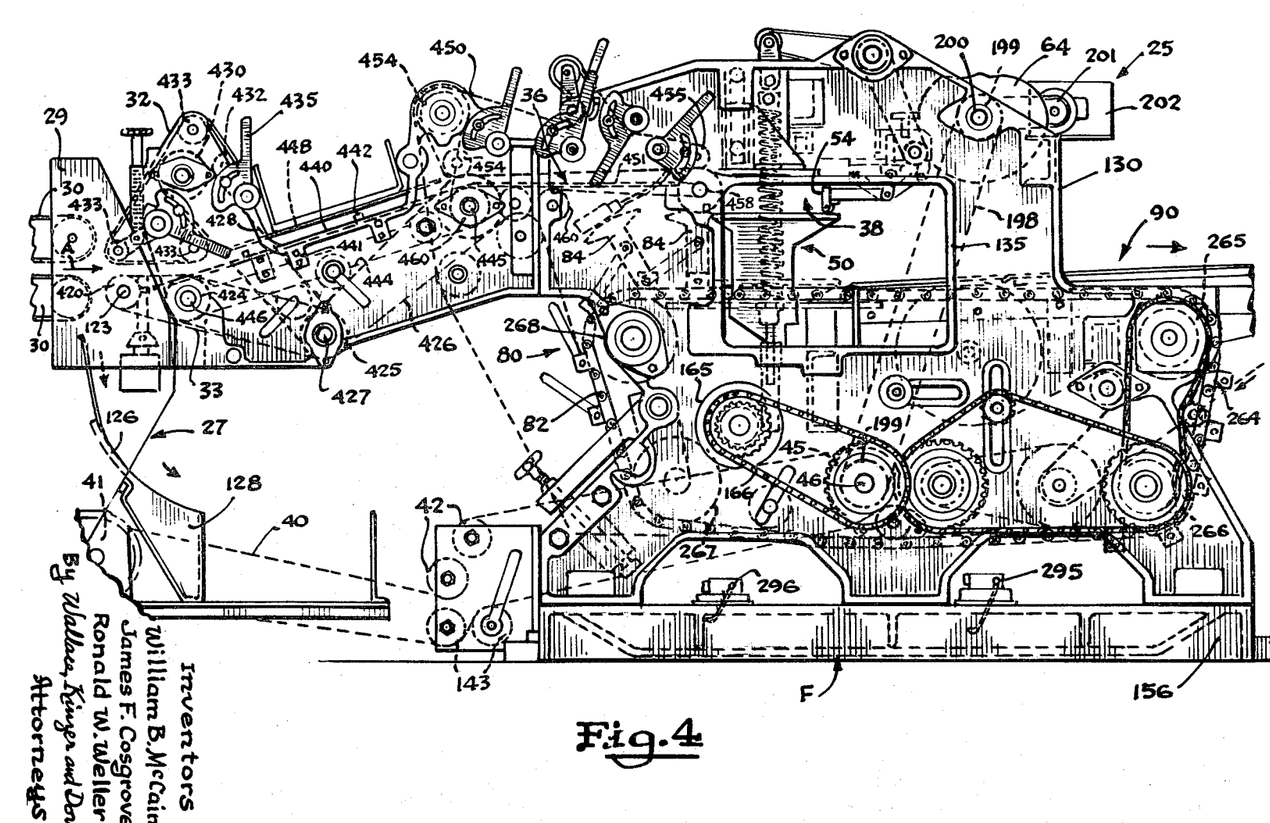
FIG. 4 is an elevational view of the stacking machine of FIG. 1.

Referring now to the drawings and more particularly to FIGS. 1 and 4, there is illustrated a stacker machine constructed in accordance with the preferred embodiment of the invention. The stacker machine 25 is connected to a book trimming machine 27, FIG. 4, and stacks the output stream of books having been trimmed in the trimming machine 27. While the invention is not to be construed as specifically limited to any particular article being stacked therein, the illustrated machine 25 is described herein as stacking books B, FIG. 8, in the form of magazines.

The stacker 25 receives books at its leftward end, FIG. 4, from discharge conveyor belts 30 of the trimming machine 27. The books B move along a path indicated by an upper arrow A into the bight of a pair of conveyor belts or tapes 32 and 33 providing the initial conveying of the books to an upwardly inclined conveyor 35 to generally horizontal conveyor 36 leading to a stacking station ST.

In the preferred embodiment of the invention, the operation of the stacker 25 is synchronized with the operation of the trimmer machine 27; and to this end the stacker machine 25 is connected by a driving belt or chain 40 to a motor 41 of the trimmer machine. As best seen in FIG. 4, the driving chain 40 is entrained about an idler gear 42 to a main driving sprocket 45 and drive shaft 46, FIGS. 1 and 2.

The books are conveyed by the conveyor 36 into the stacking station ST in a relatively steady stream at a relatively high surface speed of approximately 22 inches per cycle. The books are deposited one on top of another on a platform 50, hereinafter referred to as a "lowerator," to form a stack in the stacking station ST.

In the preferred embodiment of the invention, the trimming machine 27 furnishes simultaneously two books with one book superimposed upon the other. That is, the books are two high and are deposited simultaneously on the lowerator 50. As each of the superimposed pair of books is impelled by the conveyor 36 into the stacking station ST, the books move forwardly to engage a register or stop device 54, FIG. 4, which aligns the backbones of the incoming books.

At the beginning of the stacking operation, the lowerator 50 is disposed upwardly and moves downwardly by an increment equal to the thickness of two books. The lowerator 50 is driven downwardly by patter tamper mechanism 60, FIG. 10, which includes a relatively flat bottom plate 61, moved downwardly by a spring means 62 to engage the top book in the stack on the lowerator 50, FIG. 10. The patter 61 moves downwardly into contact with books on the platform 50 under the selective and cyclic control of a cam means 63 which includes a cam 64 and a cam follower 65, FIG. 10.

Figures 9, 10, 11, 12:
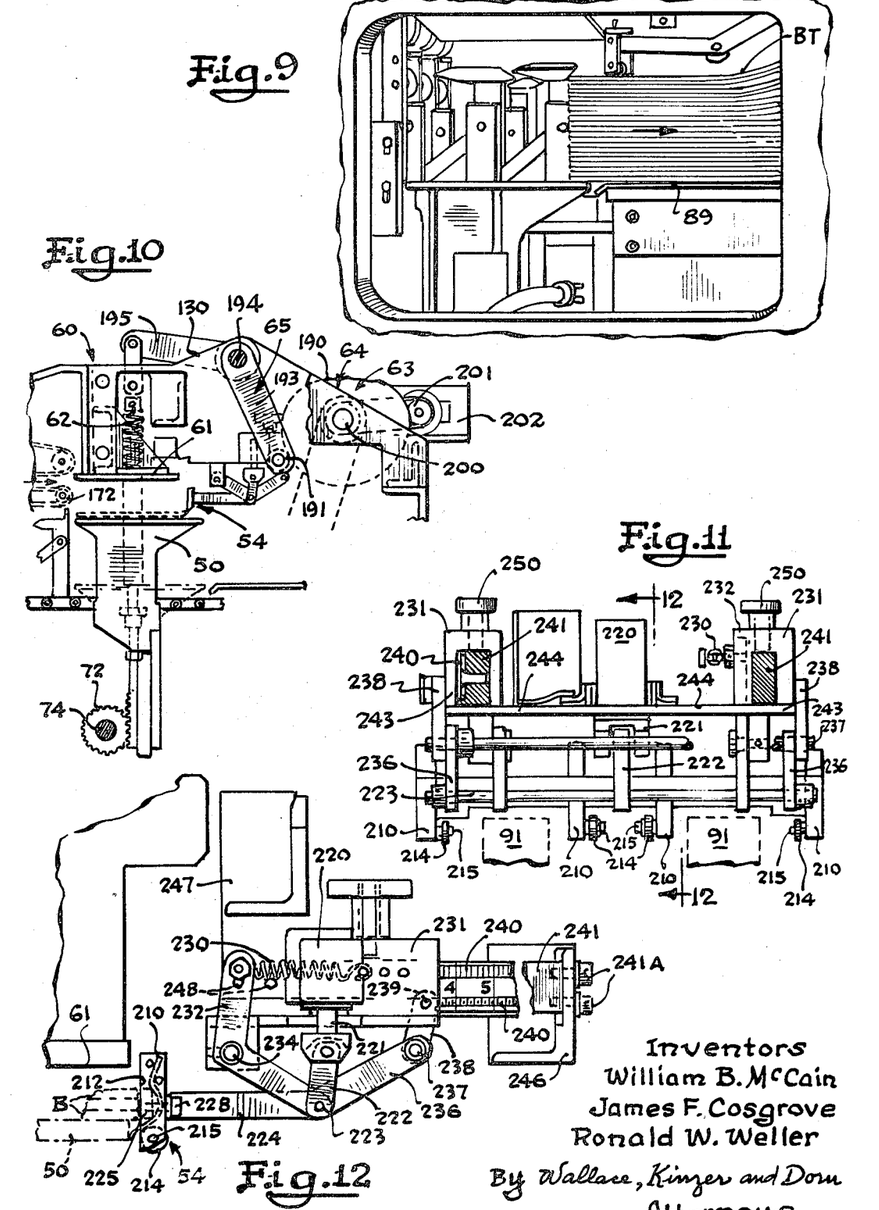
FIG. 10 illustrates controlling means for compressing the books.
FIG. 11 is a sectional view of a selectively operable register mechanism.
FIG. 12 is a view taken along the lines 12—12 of FIG. 11 showing the register mechanism.
Figure 15:
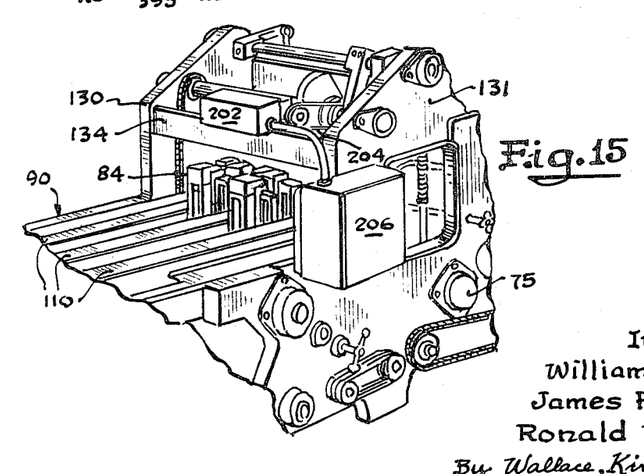
FIG. 15 is a perspective view of FIG. 14.
Figure 22:
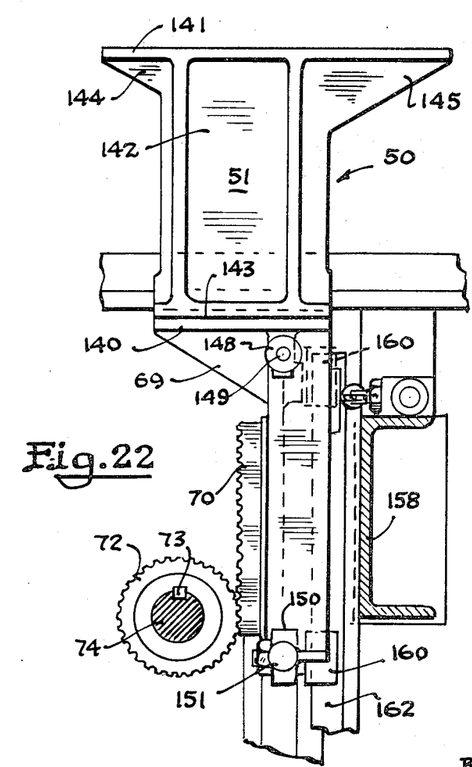
FIG. 22 is an enlarged view of the lowerator for a stack being formed in the stacking station.

The lowerator 50, as best seen in FIGS. 10 and 22, is guided for sliding vertical movement within channel members 63, FIG. 22. On the rearward side of the lower portion of the stack lowerator 50, there is secured a vertical rack 70, which is in engagement with a gear 72 secured by key means 73 to a shaft 74. The shaft 74 is connected to an electrical brake 75, FIG. 15. The electrical brake 75 acts as a retarding means which provides a retarding force to hold the lowerator 50 in the position in which it was driven until the lowerator 50 is again driven downwardly by the engagement of the patter 61 with the uppermost book in the stack. Thus, it should be apparent that the force of the patter 61, as provided by the spring 62, is sufficient to move the lowerator 50 downwardly with racks 70 turning the gears 72 and the shaft 74 overcoming the retarding grip of the electric brake 75.

The books received from the trimmer machine 27 have generally expanded backbones because the backbone has been recently expanded during its travel across a saddle during a stitching or stapling operation prior to the trimming of the book. The patter 61 serves to drive the air out of the books and flatten the backbones of the books. Thus, the canting of the topmost books to the horizontal due to the thicker backbones of the top books is alleviated. Even so, the backbone portions of books form a higher portion in the stack, as best seen in FIG. 8, while the middle of the stack is lower than even the trailing front cut edges E of the stack, FIG. 8.

The aforementioned shape of the stack as well as the usual slick covers on the books aggravate the problem of retaining the stack in a neat, aligned and relatively square arrangement particularly during the removal of the stack from the stacking station ST. As will be appreciated, the starting and stopping of the entire stacking machine 25 during the removal of the stack would be undesirable from a production and efficiency standpoint. Also the removal of the stack at the high speed of 36 inches per cycle, or greater, to remove the stack between pairs of incoming books, also renders the stack liable to being disarranged. Under the present invention, the conveyor mechanism 36 continues to deliver books into the stacking station ST while the stack is being removed at a relatively much slower speed of 10 inches per cycle.

The preferred manner of removing the stack is by means of a transfer conveyor means 80, FIG. 4, which includes endless chains 82 on which are secured a plurality of pusher and temporary support elements 84. As can best be understood from viewing FIGS. 6, 8, 9 and 13, the leading one of the pusher and supporting elements 84 has a forward edge 88 for engaging the front cut edges E of the stack and pushing the stack forwardly from the surface of the lowerator 50 on to the surface 89, FIG. 8, of a table 90, which has its height adjusted to the plane of the upper surface of the lowerator 50. Consequently, the stack S and the lowermost book BL do not experience a free fall as the stack S is removed from the lowerator 50, as seen through the successive views of FIGS. 8, 9 and 13.

Figure 8:
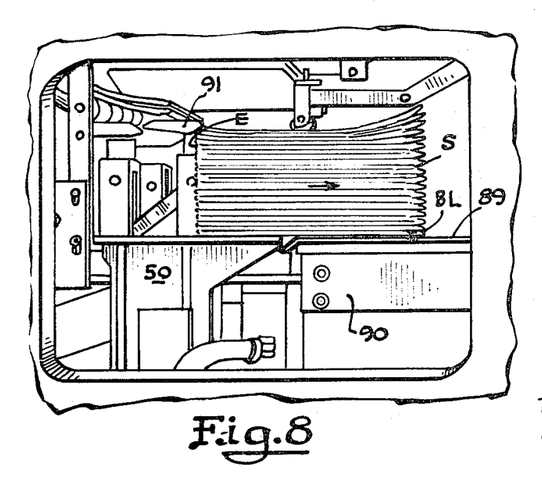
FIGS. 8 and 9 show sequential steps during the removal of a stack from a stacking station.
Figure 13:
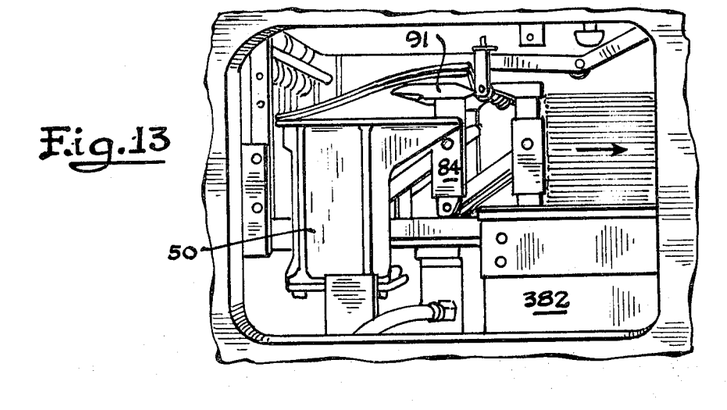
FIG. 13 illustrates the removal of the stack of books from the stacking station.

The pusher and support elements 84 also serve the function of holding the incoming books for the next stack, FIG. 8, on temporary support elements 91 of inverted foot shape. The elements 91 are secured to the upper portions of the pusher and support elements 84. The elements 91 support the incoming books, for one or two cycles before the outgoing stack has reached the position shown in FIG. 13. When the transfer conveying mechanism has moved through approximately 10–12 inches of travel, a limit switch is actuated to engage an electric clutch which connects the shaft 72 for positive rotation in its reverse direction to drive the lowerator 50 upwardly, as seen in FIG. 13, to support the books held temporarily by the elements 91.

Figure 16:
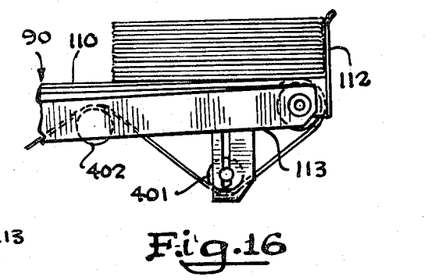
FIG. 16 illustrates a supporting table for the stacks of an inclined position.
Figure 19:
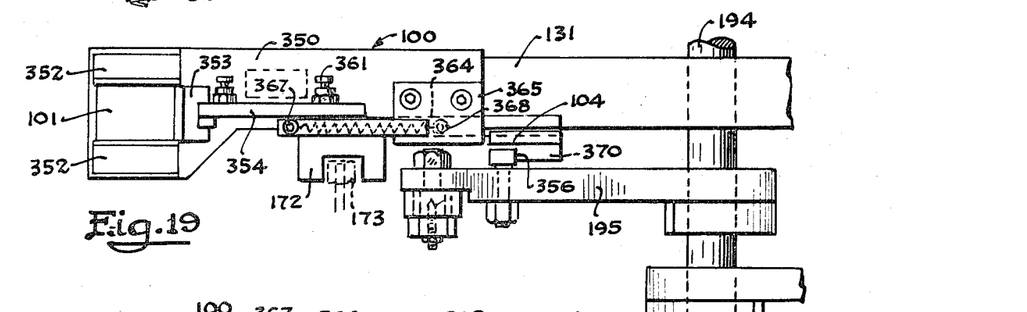
FIG. 19 is a plan view of a latching mechanism for disabling operation of the presser.
Figure 20:
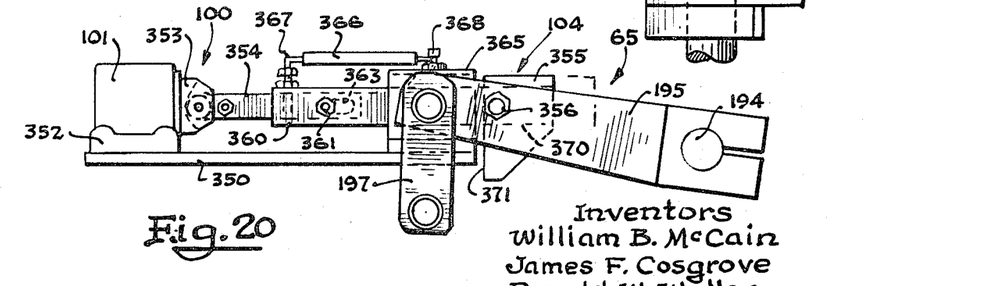
FIG. 20 is an elevational view of the latching mechanism of FIG. 19.

The operation of the patter 61 is suspended during the removal of the stack by means of a selectively operable latch mechanism 100, FIGS. 19 and 20. The selectively operable latch mechanism 100 includes a solenoid 101 which is energized by a counter after the selected number of books are in the stack. Energization of the solenoid 101 causes a latch 104 to be moved into the path of travel of the cam follower arm 65 to prevent the cam follower arm from following the cam 64 thereby holding the patter 61 against downward movement when its control cam permits downward movement. The support and pusher members 84 only move the stack sufficiently forward until the stack is disposed on conveyor belts or tapes 110, FIGS. 14–16, which tapes 110 move at a higher speed to move the stack S outwardly to outer stop rods 112 at the discharge end of the stacker. As will be explained in greater detail hereinafter, table 90 is supporting the stack while the stack is being moved by the conveyor bands 110. The table 90 is pivotally mounted so that the table 90 can be inclined slightly above or below the horizontal depending on the canting of the books in the stack and the sliding characteristic of the stack of books.

In order to assure a proper count, the thickness of the superimposed books is measured. When thickness is either too great or too little, the book deflecting means 120, FIG. 23, including a solenoid 121 is operated to pivot a deflecting guide element 122 about a shaft 123 to guide the incoming book from the conveyor belts 30 downwardly about a curved surface 125 on the underside of the deflector 122 to a chute 126 leading to a collector 128, FIG. 4. Thus, the count is not disrupted and the machine 25 continues to operate and need not be shut down because of detection of a single book.

*Detailed description*

Figures 2, 3:
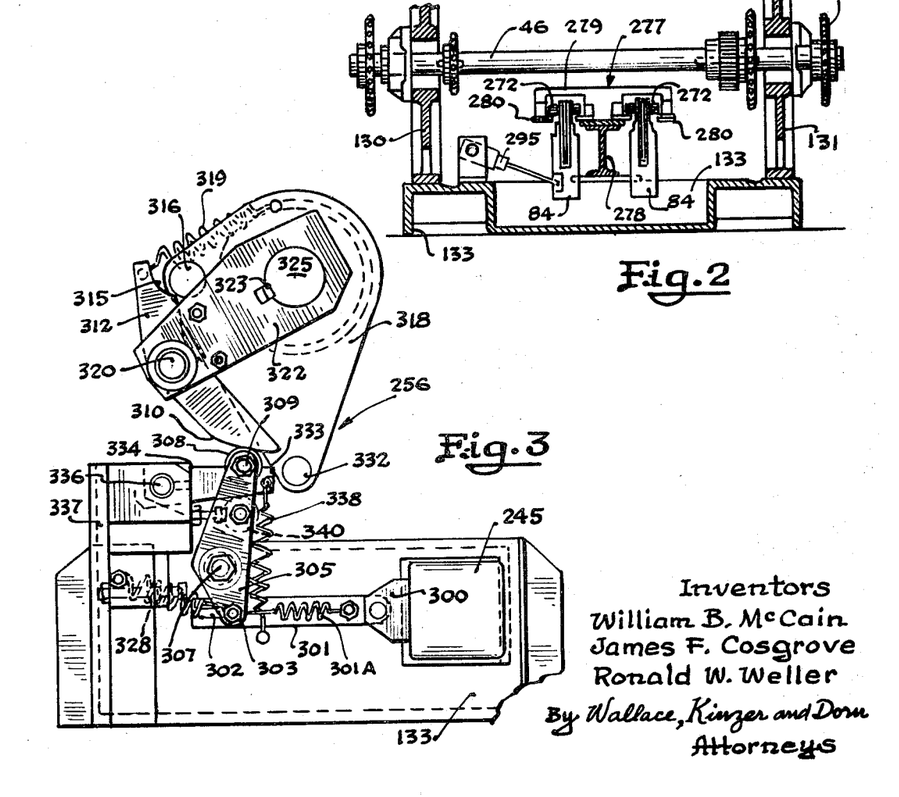
FIG. 2 is a partial sectional view taken along the lines 2—2 of FIG. 1 showing a main drive shaft.
FIG. 3 is an enlarged elevational view of clutching mechanism controlling a stack conveying transfer chain.

The stacking machine 25 has a frame F, FIG. 1, composed of vertical side plates or castings 130 and 131, FIG. 2, extending upwardly from a base casting 133. Drive shafts such as the main drive shaft 46, FIG. 2, and brace members such as the brace member 134, FIGS. 14 and 15, extend laterally between the two support vertical frame castings 130 and 131 and thereby add rigidity to the frame F. The stacking station ST is located between the frame members 130 and 131 at the location of the window or openings 135, FIGS. 1 and 4, through which may be seen the lowerator 50. The stacking station ST may be defined as that portion of the stacking machine wherein the incoming books or signatures are accumulated one on another in a piled or stacked relationship.

Figure 21:
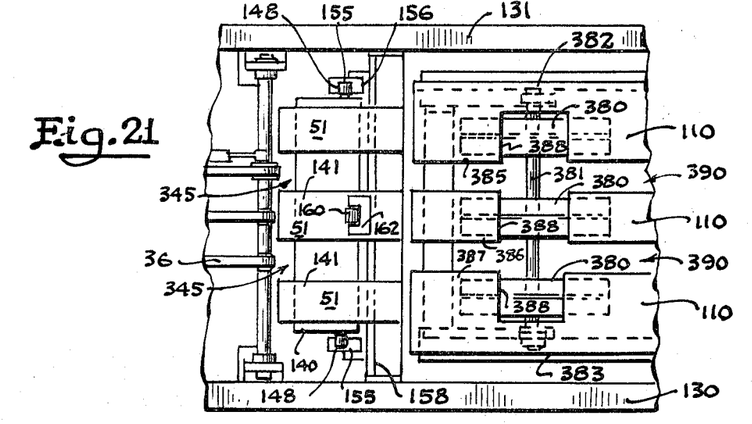
FIG. 21 is a plan view of support table and stack transferring tapes.

The detailed construction and operation of the lowerator 50 can best be understood in conjunction with FIGS. 21 and 22. The lowerator 50 is comprised of three distinct stack engaging and support members 51, FIGS. 21 and 22, which are secured to and upstand from a common carriage 140. Each of the three support members 51 of the lowerator 50 has a generally rectangular and flat upper surface 141 which is integral with a main vertical body portion 142. The body portions 142 are each secured at a lower surface 143 to the carriage 140. The upper supporting surfaces 141 of the support members 51 extend considerably forwardly and rearwardly to form pointed portions 144 and 145 thereby providing a relatively long support area extending from approximately the end of the input conveyor 36, FIG. 10, to the front register 54.

The lowerator carriage 140 is guided for vertical sliding movement by upper rollers 148, FIGS. 21 and 22, journaled on pins 149 to the carriage member 140 and a pair of lower rollers 151 aligned vertically with the upper rollers 148 and secured to the lower portion 150 of the carriage 140. The upper and lower rollers 148 and 151 roll within guide channels or tracks 155, FIG. 21, which are vertically oriented and generally U-shaped members. The vertical track members 155 are secured by fasteners 156 to a cross frame member 158 extending laterally across the counter-stacker machine 25 between the vertical support frame castings 130 and 131. The rollers 148 and 149 are thus guided in track members 155 preventing the movement of the lowerator 50 in the longitudinal direction. To hold the lowerator 50 against moving laterally towards one of the vertical side castings 130 and 131, the lowerator carriage 140 has a pair of side motion rollers 160 disposed for rolling engagement within a guiding channel 162, FIG. 21, secured to and generally medially of the cross frame member 158. The guiding channel 162 thus serves to guide the upper and lower spaced rollers 160.

It will be recalled that the lowerator 50 is driven upwardly upon rotation of the driving shaft 74 and attached gears 72 which are in engagement with the racks 70. The rotation of the shaft 74 to raise the lowerator 50 is controlled by the operation of an electrical clutch 165, FIGS. 1 and 4, secured at the outer end of the shaft 74. The electrical clutch 165 causes the coupling of the shaft 74 at the driven side of the clutch 165 to the driving side of the clutch 165, which in turn is driven by a chain 166 entrained about a sprocket 167 secured to the main driving shaft 46. Consequently, when the electric clutch 165 is energized, the main driving shaft 46 drives the shaft 74 through the chain 166 and clutch 165 to raise the lowerator 50. A stationary micro-switch (not shown) secured to the frame F is engaged by lowerator 50 when the lowerator 50 moves upwardly to a position adjacent to the end of the input conveyor 36. The micro-switch de-energizes the electric clutch 136, and simultaneously causes operation of the electric brake 75, which is at the opposite end of the shaft 74 and which is on the opposite vertical support casting 131, FIG. 15, to hold the lowerator 50 in its uppermost position.

As seen in FIG. 13, the lowerator 50 moves upwardly to engage and take over the support of the accumulated books B, which are now being released by the trailing temporary supports 91, FIG. 13, moving out of the stacking station ST. The lowerator 50 is thus in position to be driven downwardly by the patter 61.

Figures 17, 18:
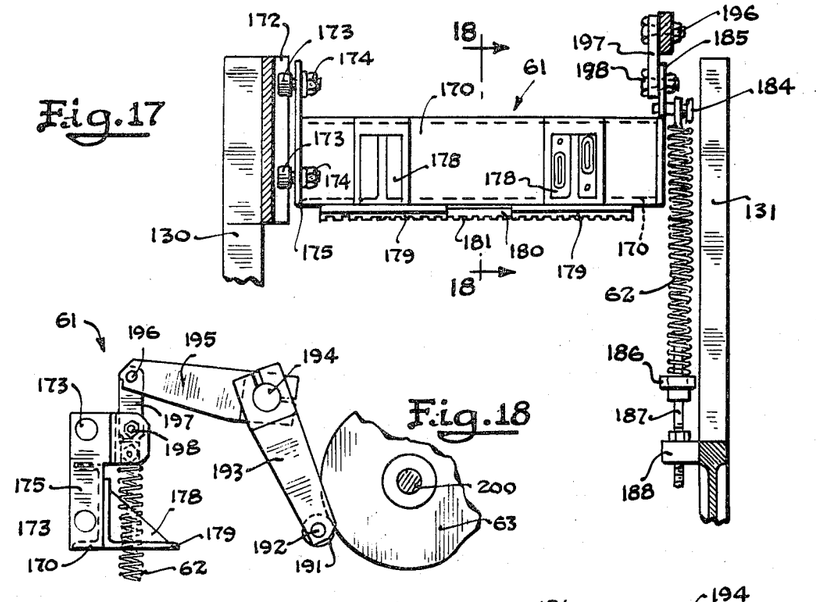
FIG. 17 is a sectional view showing the presser.
FIG. 18 is a sectional view taken along the line 18—18 of FIG. 17 and showing the cam controlled operation of the presser.

The patter 61 shown in detail in FIGS. 10, 17 and 18, includes a channel-shaped member 170, FIGS. 17 and 18, which extends laterally across the stacking station ST between the vertical frame members 130 and 131. For the purpose of guiding the patter 61 during its vertical movement, vertical guide tracks 172, FIGS. 17 and 19, of U-shaped configurations, receive therein upper and lower track rollers 173 on the patter 61. The rollers 173 are secured by suitable fasteners 174 to vertically oriented plates 175, which are secured at their end portions on the channel 170. The vertical guide tracks 172 are secured to respective frame castings 130 and 131, FIGS. 17 and 19, to guide the rollers 173 relative thereto.

The patter 61 includes a pair of adjustably mounted brackets 178 secured to the main channel member 170, with the bottom surfaces 179 of the brackets 178 generally flush with the bottom surfaces of the channel 170, as seen in FIG. 18.

Referring to FIG. 17, the bottom surfaces 179 of the brackets 178 have secured thereto a patter plate 180 having a plurality of grooves or serations on the bottom surface thereof for affording spaced contact with the top surface of a book or signature. The grooves 181 in the patter plate 180 allow the air to escape between the book being engaged and the plate. The patter 180 is preferably made from wood or other material which will not mar the surface of the books or the like when being pressed thereagainst.

The large contractile spring 62 provides the downward force for driving the patter 61 downwardly with sufficient force to flatten the books and also with sufficient force to move the lowerator 50 downwardly against the retarding force afforded by the electrical brake 75. The large contractile spring 62 is connected at its upper end by a fastener 184 to a plate 185 secured at the right hand end of the channel member 170, FIG. 17.

The lower end of the contractile spring 62 is secured to an internally threaded member 186. A threaded stud 187 extends upwardly through the member 186 and is threadedly secured to a boss 188 of the frame member 131. Turning of the threaded stud 187 adjusts the tension of the contractile spring to provide the desired amount of pressing force for engagement with the books. Manifestly, the pressing force must be sufficient to overcome the retarding force provided by the electrical brake 75 at the same time to drive the lowerator 50 downwardly, but the force should not be such that it causes scarring or damaging of the topmost book being engaged by the patter member 180.

The cyclic operation of the patter 61 is controlled by rotation of the cam 64 whose contour is followed by the cam follower 65. More specifically, during each rotation of the cam 64, FIG. 10, the flat portion 190 of the cam 64 moves into engagement with follower roller 191 journalled by a pin 192 to a cam follower arm 193, which is secured to the rock shaft 194. The rock shaft 194 is journaled in the respective frame members 130 and 131, FIG. 10. Also secured to the rock shaft 194 is a cam follower arm 195, which is secured by a pin 196 to a vertically disclosed link 197, FIG. 17, which has its lower end secured by a fastener 198 to the plate 185 secured to the channel member 170 of the patter 61.

It will be appreciated from the foregoing, that the contractile spring 62 exerts a biasing force through the link 197 and arms 195 and 193 to hold the cam follower roller 191 in tight engagement with the peripheral surface of the cam 64. Thus, as the flattened portion 190 of the cam 64 rotates into engagement with the cam follower roller 191, the arms 193 and 195 rotate in a counterclockwise direction, FIG. 10, permitting the spring 62 to pull the platter 61 downwardly into engagement with the top book on the stack and to force the lowerator 50 downwardly and thereby rotate the gear 72 and shaft 74 which resist rotation by the amount of retarding force as provided by the electric brake 75. As the cam 64 rotates, the higher portions of the cam 74 rotate the cam follower 65 in a clockwise direction, thereby lifting the patter 61 against the force of the contractile spring 62.

Figures 5, 6:
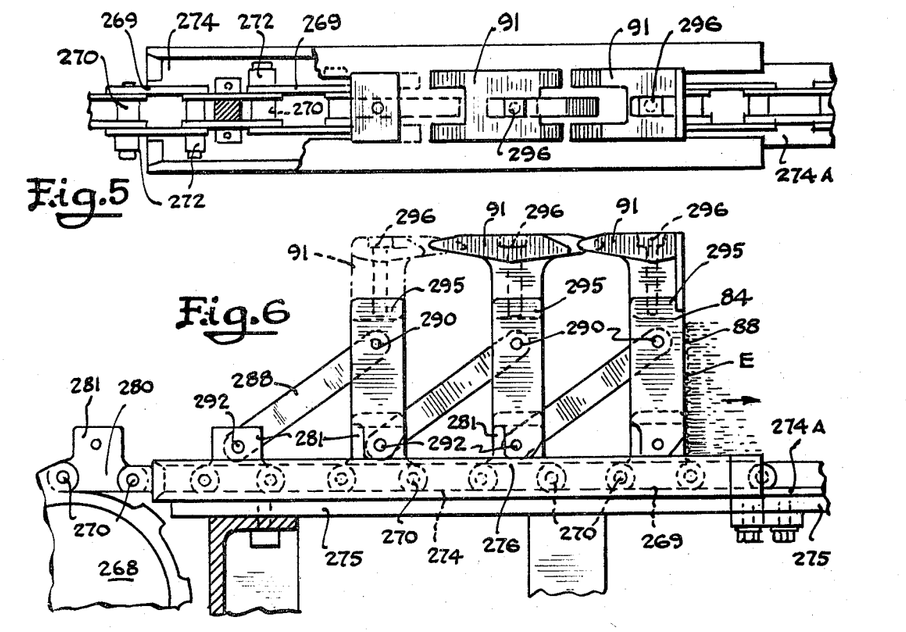
FIG. 5 is a plan view of a temporary support and a transfer chain.
FIG. 6 is an elevational view of the stack transfer and conveying mechanism.

The cam 64 is secured to a continuously rotating shaft 200 journaled at the vertical frame castings, FIGS. 4 and 5. The cam shaft is rotated by a chain 198, which is entrained about a sprocket 199, FIG. 4, on the main drive shaft 46 and about a driving sprocket 199 on a cam shaft 200. A pulley 204, FIG. 15, from the cam shaft 200 drives a sequential cam arrangement disposed within a housing 202 which is connected to an electric control box 206 which has an electrical counter associated therewith.

The cyclic operations of the stacking machine correspond to discrete intervals between successive books being deposited in the stacking station. More particularly, the patter 61 is driven so as to be in the uppermost position as the incoming books are being deposited. In the interval between deposition of books the patter 61 moves downwardly and compresses the stacked books and moves upwardly out of the path of the next incoming book. This timing is achieved by having the main drive shaft 46 driven in synchronism with the receipt of books from the conveyor 30 and by having the drive shaft 46 drive the conveyors 32, 35 and 36 and cam shaft 200. The cam 64 is adjustably secured to the cam shaft 200 for selective indexing to obtain the desired timing of the patter 61 to the depositing of books by conveyor 36.

It will be recalled that a front stop or registering mechanism 54 is provided at the stacking station ST to align the backbones of the books in a neatly aligned relationship. More specifically, the register or stopping mechanism 54 includes four stop finger elements 210, FIGS. 11 and 12. The four stop elements 210 in the form of vertically oriented members, have their forward faces 212, FIG. 12, disposed in a common plane for engagement with the books B supported on the lowerator 50. The lower portion of the register bars 210 have rollers 214 journaled on pins 215. The lower edges of the register bars 210 are normally disposed beneath the topmost surface of the books on the lowerator 50. Before a stack of books is removed, the register bars 210 are pivoted upwardly and rearwardly to inoperative position clear of the path of movement of the uppermost books in the stack, particularly above the backbones of the uppermost books of the stack.

After the stack has been formed, as determined by an electric counter mechanism, the register means 54 is lifted with operation of the solenoid 220. The solenoid 220 is operated to pull in its plunger 221, FIG. 12, to lift upwardly a link 222 pivoted thereto. The link 222 is connected at the lower portion thereof by a rod 223 to lever arms 224, which at their forward ends are secured to a lateral bar 225 extending across and between the arms 224. The respective register bars 210 are secured by fasteners 228, FIG. 12, to the bar 225 at space positions, as seen in FIG. 11. This spacing of the register bars 210 allows the temporary supports 91 to pass between the outermost register bars 210 and the central bar of register bars 210.

The register mechanism 54 is returned to its operative position upon de-energization of the solenoid 241A by a return spring 230, FIG. 12, connected at one end to a bracket 231 and connected at its opposite end to a bell crank 232. The spring 230 rotates the bell crank 232 about a pivot stud and thereby moves the register bars 210 leftwardly and downwardly to an operative registering position, as seen in FIG. 12. The lower ends of the bell cranks 232 are connected to the rod 223, as best seen in FIG. 12. The forward movement of lever arms 224 is permitted by links 238 secured to the rearward end portions 236 of lever arms 224 of pins 237. The links are secured by pivot posts 239 to the respective brackets 231. The general relationship of the bell cranks 232 and links 238 to the lever arms 224 is that upon de-energization of the solenoid, the bars 210 are moved simultaneously downwardly and leftwardly into the path of movement of the topmost books of the stack.

An important aspect of the present invention is the ability to stack various sizes of books or signatures with the stacking machine. The registering mechanism 54 is adjustably positioned relative to a scale 240 to stationary support rails 241 along which move the respective support brackets 231, as best seen in FIG. 12. The brackets 231 are generally U-shaped and are fitted over the rails 241 which serve as guides and supports for the parallel movement of the registering mechanism 54.

The brackets 231 are secured at their lower ends 243 to a bottom plate 244 extending between the two brackets 231. The supporting rails 241 are secured by fasteners 241A at their rearward end to an angle-shaped frame member 246 and the rails 241 are secured at their forward ends to another frame member 247, FIG. 12, by fasteners 248. Threaded into the top of the bracket 231 is a lock screw 250 which can be turned to bring its end downwardly to engage the upper surface of the guiding rail 241 to lock the brackets 231 against sliding movement along the rail 241. Thus, by tightening lock screw 250 the register mechanism 54 is held at a predetermined position, the location of which is indicated on the scale 240. Conversely, the lock screw 250 may be loosened and the registering mechanism 54 slid along the bars 241 to a new position.

To begin the transfer cycle for transferring the stack of books outwardly of the stacking station ST by the transfer conveyor means 80, a solenoid 245, FIGS. 1 and 3, secured at the base 133, FIG. 1, operates a clutch assembly 256 to begin movement of the previously stationary transfer conveyor means 80. The cutch assembly 256, when operated, drives a chain 257 entrained about a sprocket 258 which is connected to a shaft 259. The shaft 259 has a smaller sprocket thereon for driving at a reduced speed, a chain 260, which is connected to a main drive shaft 262 for driving the transfer conveyor chains 82, FIG. 4.

As best seen in FIG. 4, the transfer driving chains 82 have their rearward and upward portions entrained about sprockets 265 and 266, respectively. At their forward portions, the chains 264 are entrained about lower sprockets 267 and upper sprockets 268. Each chain 82 partakes of a generally horizontal movement between the sprockets 268 and 265 during its upper conveying run and similarly a general horizontal movement between the sprockets 267 and 266 along its lower return run.

Figure 7:
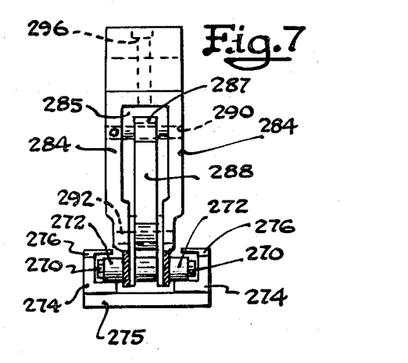
FIG. 7 is an elevational view of the stack transfer members.

As can be understood when referring to FIGS. 5, 6 and 7, it is preferred that the links 269 of the transfer chains 82 be joined to one another by pins 270, which extend laterally outward of the body of the link. The pins 270 have journaled on their outer end portion rollers 272, which are shown in FIGS. 5, 6 and 7, as being disposed within angle-shaped members 274 secured to a track plate 275 to afford a track along which the chain 82 is guided during its movement through the stacking station ST and outwardly thereof. Within the stacking station ST, the track angles 244 are provided with top cover plates 276, FIG. 7, providing an overhead covering for the top of the rollers 272. Thus, the chain links 269 and rollers 272 are covered as will be apparent from FIGS. 5, 6 and 7, during the movement of the chains through the stacking station. The chain guide angles 274, as seen in FIG. 6, extending from the sprocket 268 and across the stacking station to a lower guide track 274A for the rollers 272.

The transfer chain 82 is guided along its lower run, as best seen in FIG. 2, by a track guide 277 along which the rollers 272 roll to hold the pushers 84 for a generally horizontal movement. The track guide 277 is fixedly mounted to a beam 278 extending longitudinally along the center line of the stacking machine and secured to the base casting 133. The track guide 277 has an overhanging plate 279 to which are secured four roller guide bars 280 across the upper surfaces of which are guided the chain rollers 272.

For supporting the pushers 84, the transfer chains have links 269 with an upstanding central body portion 281, FIG. 6, to which are attached the spaced legs 284 of the vertical pushers 84. The open space between the legs 284 of the pusher 84 affords a generally open slot 285 into which is inserted the upper end 287 of a stabilizing link 288. The stabilizing links 288 are connected to preceding pushers 84 by pins 290 and are connected to the trailing chain body portion 281 by lower connecting pins 292. The pins 292 also connect the legs 284 of the pushers 84 to the link body portions 281.

The temporary supports 91 for holding incoming books, during a stack removal operation, are secured by suitable fasteners 296 to the upper portions 295 of the pushers 84. The number of temporary supports 91 is determined by the size of the book or signature. Where relatively narrow books are being stacked, an additional support 91, shown in dotted lines, is attached to the left hand pusher 84. For relatively wide width of books, the trailing temporary support 91 is omitted to prevent its being engaged by the pattern 61 when the patter is next operated downwardly after having been latched in its inoperative position.

The extent of movement of the transfer and conveyor mechanism is determined by micro-switches 295 and 296, FIGS. 2 and 4, secured to the base casting 133 and mechanically operated by the pushers 84. The micro-switches 295 and 296 are spaced apart approximately 30 inches which is sufficient conveyor travel to move the books from the stacking station ST. The micro-switch 296 controls the transfer conveyor clutch solenoid 245, FIG. 3, and thereby the clutch 256 for the conveyor mechanism 80.

The transfer conveyor clutch 256 is engaged after the solenoid 245, FIG. 3, is de-energized. Solenoid plunger 300 is pinned to a link 301 which has slot 302 to receive a pin 303 of a lever 305. A return spring 328 is connected to the pin 303 of the lever 305 to pull the lever pin 303, link 301, and solenoid plunger 300 leftwardly to engage the clutch 256. An overload spring 301A connects the link 301 to the pin 303.

The lever 305 is pivotally mounted by a pivoted stud 307 secured to the base 133 and has a cam roller 308 journaled on a pin 309. The roller 308 is for engagement with a cam surface 310 on a pivoted arm 312. The arm 312 has at its opposite end a pin engaging socket 315 for coupling engagement with a pin 316 of a clutch output plate 318. A contractile spring 319 is connected between the upper end of the lever 312 and the clutch output plate 318.

The lever 312 is pivotally mounted by a stud 320 on a continuously rotating clutch arm 322, which is keyed by a keying member 323 to a continuously rotating input and driving shaft 325.

When the clutch is disengaged, the rotating input shaft 325 rotates the arm 322 and attached lever 312 in a clockwise direction, as seen in FIG. 3, to bring the cam surface 310 into the engagement with the roller 308 to pivot the lever 312 in a counterclockwise direction about the pivot stud 320 thereby preventing the engagement of the socket 315 on the lever 312 with the driving stud 316 of the driven plate 318. So long as this camming operation occurs, the driving interconnection between the socket 315 of the lever 312 and the stud 316 of the output clutch plate 318 is prevented.

In operation of the clutch, solenoid 245 is de-energized and return spring 328 pulls the link 301 leftwardly, FIG. 3, and pivots the lever 305 in a clockwise direction. The roller 308 on lever 305 is free of engagement with the lever 312 and the spring 319 is able to pivot the lever 312 in a clockwise direction about the pivot stud 320, thereby coupling the driving lever 312 with the stud 316 on the driven clutch plate 318. The driving engagement of sockets 315 and pin 316 continues until the solenoid 245 is energized whereupon the plunger 300 and link 301 through spring 301A pull the lever 305 to rotate the lever 305 in a counterclockwise direction to bring the disengaging roller 308 back into the path of the driving arm 312 along the cam surface 310. Thus, the cam roller 308 will maintain the clutch in its disengaging position.

To assure quick and accurate stopping of the transfer conveyor mechanism 80, an electric brake 330, FIG. 1, is secured at the main driving shaft 262 for the transfer chain to exert a braking force on the transfer chain driving shaft 262. It is preferred that the electric brake 330 stop the movement of the transfer chain driving shaft 262 and chains 260 and 257, and thereby stop the rotation of the driven clutch plate 318 before pin 332, FIG. 3, on the bottom portion of the driven clutch plate 318 engages a generally vertical stop surface 333 on a pivotally mounted stop arm 334. The stop arm 334 is pivotally mounted on a pivot stud 336 secured to the bracket 337, which in turn is secured to the base 133. The stop arm 333 is biased away from its stopping position, FIG. 3, by a contractile spring 338, which is secured at its upper end to stop arm 333 and at its lower end to the base 133. An additional roller 340 is provided on the lever 305 to engage the undersurface of the stop arm 333 to render the stop arm 333 operative at the time of disengaging clutch. That is, when the lever arm 305 pivots counterclockwise into its clutch release position, the roller 340 forces the stop 334 to rotate into position for engagement with pin 332 on the driven clutch member 318.

In practice, it has been found that the electric brake 330 stops the transfer conveying mechanism just prior to the engagement of the pin 332 with the stop arm 333. Thus, the driven transfer conveyor mechanism 80 stops without a significant impact between the driving pins 332 and 333, which would afford the final positioning of the conveyor mechanism 80 if it did stop under the retarding force of the electric brake 330. In the embodimtnt of the invention shown herein, two conveyor chains 264 each have four sets of pusher members 84 located at four spaced locations.

The transfer conveyor mechanism 80 stops with the pushers 84 at the position shown in full lines in FIG. 4, with the foremost pusher 84 disposed just outside of the stacking station and the lowerator 50 and beneath the discharge end of the input conveyor 36. It is to be understood that pushers 84 move between the lowerator supports 51, FIG. 31, in the openings 345, FIG. 21, formed by the spaced mounting of the lowerator supports 51 to the lowerator carriage 140. During the movement of the temporary book supports 91 through opening 345 and through the stacking station ST, the patter 61 is latched by the latch mechanism 100 in its upward position to prevent the patter 61 from moving down and engaging the temporary book supports 91.

The latch mechanism 100 when shown in its latching FIGS. 19 and 20, which is secured to the top of the vertical frame member 131. The support bracket plate 350 supports the solenoid 101, which is secured thereto by bracket members 352.

The latch mechanism 100 when shown in its latching position in FIGS. 19 and 20, with its plunger 353 retracted and pulling an attached link 354 to the left, as viewed in these figures, brings a latching block 355 into a blocking position to intercept and hold against downward movement a latch pin 356, which is secured on the cam follower and operating arm 195. The link 354 is secured to a slide member 360 by a fastener 361 movable in a slot 363 to afford adjustment for the latch block 355 secured to the slide 360. The slide 360 is guided for sliding movement in a slideway 364 in a block 365 secured by fasteners to the support plate 350.

A return spring 366 is secured at one end to a threaded post 367 threaded into the slide 360 and urges the slide 360 rightwardly towards the block 365. Thus, when the solenoid 101 de-energizes, the return spring 366 pulls the slide 360 and link 354 rightwardly thereby moving the latching block 355 rightwardly out of the path of movement of the pin 356. Thus, the cam follower 63 resumes its full downward movement as the pin 356 moves downwardly past the latching surface 370 on the latch block 355.

If the latching solenoid 101 is operated while the patter 61 is in its downward position, the link 354 pulls the slide and latch block 355 leftwardly, FIG. 20, and moves the vertical forward edge 371 on the block 355 into engagement with the pin 356 on the cam follower lever arm 195. The latch block 355 is thus prevented from moving to its blocking position until the pin 356 moves above the latch surface 370. The latch block 355 is then free of engagement with the latch pin 356 so that the latch block 355 can be pulled further to the left, as viewed in FIGS. 19 and 20, to dispose the latch surface 370 beneath the pin 356. Thus, on the subsequent downward movement of the arm 195 and pin 356, the latch pin 356 engages the latch surface 370 and holds the latch arm 195 against further downward movement under the urging of the patter biasing spring 62. During the latching of the cam follower 65, the cam follower roller 191 rides free of the cam flat surface 190 on the cam 64. In practice, the cam 64 goes through approximately one rotation corresponding to one cycle of incoming books while the pushers 84 are removing the stack from the stacking station, even though the stack is moving at the slower speed of 10 inches per cycle while the books are incoming into the stacking station at approximately 22 inches per cycle. Upon de-energization of the electromagnet 101, the spring 366 returns the latch block 355 to its dotted line position, FIG. 20, of the arm 195 and permits the patter 61 to again resume operation.

To avoid disturbing the stack during the removal of the stack, it is preferred that the top surface 89 of the support table 90, FIG. 8, be at the level of the bottommost book BL of the stack. Because the thickness of the stack varies considerably, with changes in the number of books in a stack and/or the thickness of the particular books comprising the stack, the table 90 is vertically adjustable. The table 90 includes an upper supporting plate 113, FIG. 14, with three wide conveyor belts 110 being exposed in longitudinal openings to engage the stack. The three wide belts 110 begin their upper conveying run for the stack as the belts move around pulleys 380, FIG. 21, journaled for rotation about a common shaft 381 secured between vertically oriented plates 382 and 383 constituting the supports for the table 90. The supporting surface adjacent the tapes 110 at the forward end of the table is furnished by three flat supporting plates 385, 386 and 387, FIG. 21, which open at edges 388 permitting the tapes 110 to be exposed above the pulleys 380.

Figure 14:
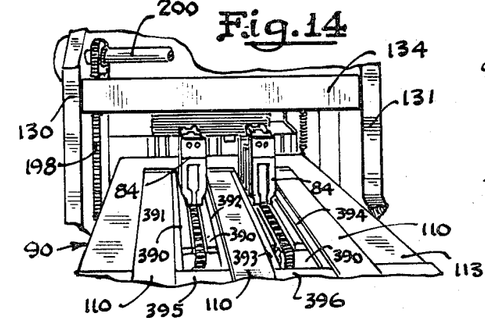
FIG. 14 is an end view of the stack transfer mechanism in its inoperative position after the removal of the stack of books.

As apparent from FIG. 14, openings 390 are provided between narrow strips of support plates 391, 392, 393 and 394, to permit the pushers 84 to move the stack completely on the belts 110 before the pushers 84 swing downwardly through the openings 390. At the rear portion of the table 90, a pair of flat support plates 395 and 396, FIG. 14, provide a covered surface between the belts 110 over the remainder of the extension of the table out to the stopping bars 112. As best seen in FIG. 1, the tapes 110 move about pulleys 400 at the discharge end of the table 90 and about tensioning pulleys 401 and 402 secured to the underside of the table 90.

Another important aspect of the present invention in retaining the stack in its squared and neat shape is that the upper surface of the table 90 may be tilted or inclined to the horizontal to maintain the uppermost books of signatures in a generally horizontal condition. As has been found in many instances, it is desirable to tilt the discharge end of the table 90 upwardly, as shown in FIG. 4, to maintain the uppermost books of a stack in a generally level condition.

The table 90 includes a pair of spaced angles 470 and 471, which constitute the main support elements of the table upon which are secured the support plates 391–394. The support angles 470 and 471 are pivotally mounted at their rearward ends by a pair of opposed pivot support pins 472, FIG. 25, which are secured in table arms 473 extending rearwardly and parallel to the table angles 470. The table arms 473 are in turn pivotally mounted on pivot studs 475 secured in the respective frame castings 130 and 131. The table arms 473 are held against clockwise pivoting, FIG. 25, about the support pins 475 by a pair of adjusting screws 477, each threaded in a corresponding internally threaded boss 478. The lower ends of the adjusting screws 477 are in engagement with the upper surfaces 480 of the rearward portions 481 of the respective table arms 473.

The turning of the handles for the adjusting screws 477 turn the adjusting screws 477 through the threaded bosses 478 secured to the castings 130 and 131 and causes the rearward end 482 of the table arms 473 to pivot about the pivot supports 475 and thereby change the angle of inclination of the table 90 for the purpose of maintaining the uppermost books of the stack in a generally horizontal position during the stack removal.

Figure 25:
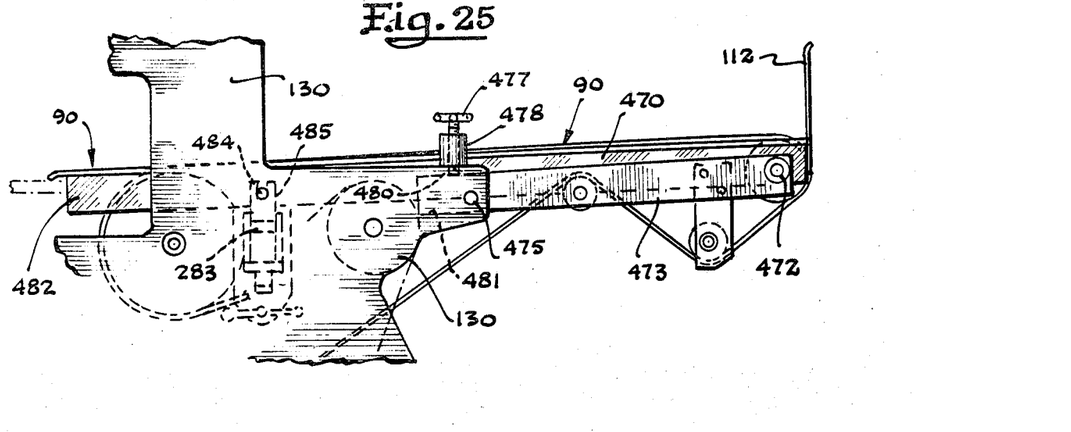
FIG. 25 is an elevational view of the table and its tilt and lift mechanism.
Figure 26:
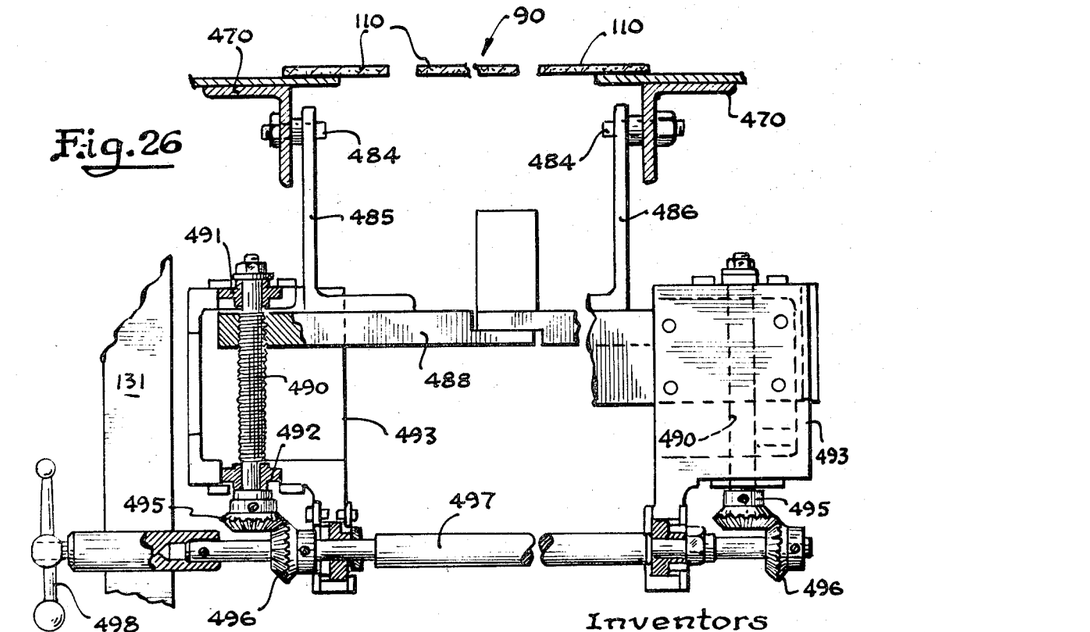
FIG. 26 is a sectional view showing the lift mechanism for the table.

To adjust the height of the forward ends 482, FIG. 25, of the table 90 to be at the level to receive the lowermost book when the stack of books is completed, the forward portion of the table 90 is supported by pins 484 resting in U-shaped pockets 283 in the brackets 485 and 486. As can best be understood from FIG. 26, the brackets 485 and 486 are angle shaped members having the lower portions thereof secured at spaced locations to a transverse plate 488. The opposite ends of the plate 488 are internally threaded to receive a screw 490 which is journaled in bearings 491 and 492 in a box shaped guide 493 secured to the respective castings 130 and 131.

The lower end of the screw 490 has a beveled gear 495 meshed with a beveled gear 496 secured to a drive shaft 497 adapted to be turned by an external operating handle 498. Turning of the operating handle 498 rotates the drive shaft 497 and respective beveled drive gears 496 to turn the drive screws 490 to move the support plate 488 vertically, which, in turn, moves vertically the brackets 485 and 486, supporting the respective table pins 484 secured to the table angles 470. Since the table angles 470 are pivotally mounted at the support pivot studs 472, the turning of the handle 498 causes the forward end 482 of the table 90 to pivot about the pivot studs 472. After the forward end 482 of the table 90 is adjusted to the appropriate height, the adjusting screws 477 are then turned to pivot the table arms 473 and the rearward portion of the table about pivot studs 475 to a position wherein the table is either at the horizontal or slightly inclined thereto.

It will be recalled that the present invention also affords a manner for automatically routing single or defective books to a discharge chute 128, FIG. 4. The book deflecting mechanism 120, FIGS. 23 and 24, includes a plurality of deflecting fingers 122 spaced across the rock shaft 123, which is secured between the main support frame members 130 and 131. The rock shaft 123 is journaled within bearings 405, FIG. 24, and is adapted to be rocked by an electromagnet 121, secured by a bracket 406 to the frame member 130. The solenoid 121 has a plunger 408, which is secured by a link 410 to a plate 441 fastened to the shaft 123.

Figure 23:
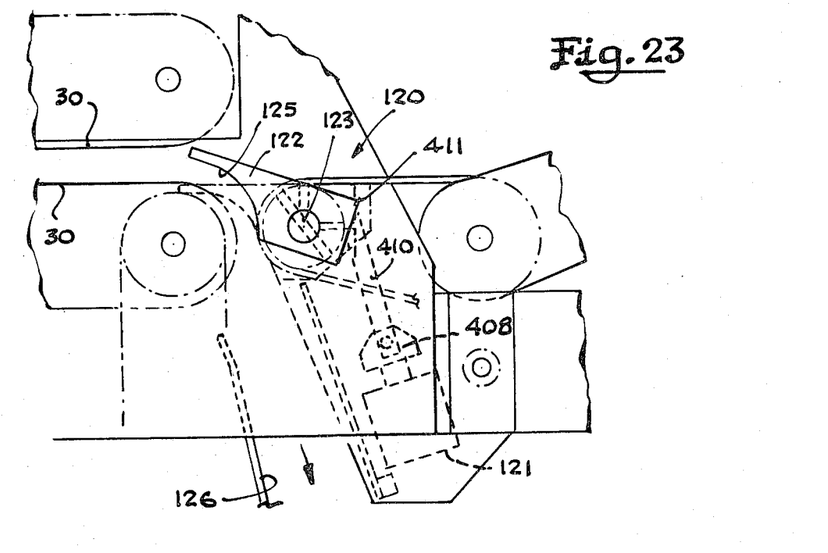
FIG. 23 illustrates a book deflector mechanism.

When a thickness detector detects a single book, the solenoid 121 is energized to pull its plunger 408 and attached link 410 downwardly to rotate the block 411 and rock shaft 123 in a clockwise direction, as seen in FIG. 23, to lift the fingers 122 from their dotted line position to the solid line position shown in FIG. 23. At this time, the curved surfaces 125 of the fingers 122 deflect the backbones of the incoming books from the books or book from the conveyor 30 downwardly and along the guide plate 126 into a collecting chute 128.

Figure 24:
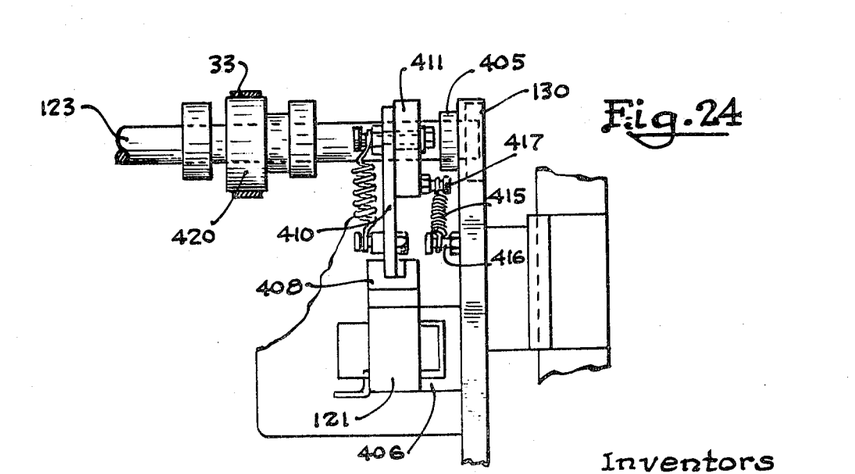
FIG. 24 is a side view of the book deflector mechanism of FIG. 23.

Upon de-energization of the solenoid 121, the fingers are returned beneath the plane of the belt 33 by a return spring 415, FIG. 24, secured to the frame member 130 by a post 416 and secured by a spring hanger 417 on the plate 411.

The rock shaft 123 supports pulleys 420, FIGS. 24 and 4, about which are guided the tapes 33 of the conveyor. The conveyor tapes 33 move about central pulleys 424, FIG. 4, and rearward pulleys 425 on a shaft 427, the shaft 427 being driven by a chain 426. The chain 426 drives the shaft 427 to which is secured a sprocket for driving a chain 428 which is secured to an upper sprocket 430 for driving a small pulley 431 to turn the tape 32 which is guided about a series of pulleys 433.

Each of the tapes 32 cooperates with a lower tape 33, and in the event of the bunching of signatures between the tapes 32 and 33, the tension of an upper tape 32 may be lessened by pulling on the handle 435, which moves the pulleys 432 to loosen the tension on the tapes 32 to permit the removal of damaged signatures in a conventional manner.

The tapes 32 and 33 deliver the book or signatures to an inclined supporting plate 440, FIG. 4, secured by brackets 441 to the respective frame members 130 and 131. The support plates 440 are provided with slots permitting conveying fingers 442 on a positive drive conveyor chain 444 to positively engage the books on the plates 440 to move the books upwardly to the belts of the conveyor 36. The positive drive conveyor chains 444 are disposed for driving engagement with sprockets secured to the shafts 445 and 446. Upper and parallel guide strips 448 are disposed over the inclined plate 440 to hold the books on the positive drive feed fingers 442 during the movement of the book or books into the bight of the tapes 450 and 451 for the conveyor 36.

The upper tapes 450 are disposed for engagement about a series of pulleys 454 leading to rearward pulleys 455 adjacent the stacking station. The lower tapes 451 are guided around a rearward pulley 458 disposed beneath the pulleys 455 and is then led between guiding pulleys 460 to forward pulleys 460 on the shaft 445. Thus, the tapes 450 and 451 of the conveyor 36 propel the books toward the shaft 458 and release the books which continue under their own momentum to move into the stacking station to engage the register mechanism 54. The books moving against the register mechanism from the conveyor 36 are thus deposited in the stacking station on the lowerator 50.

Figure 27:
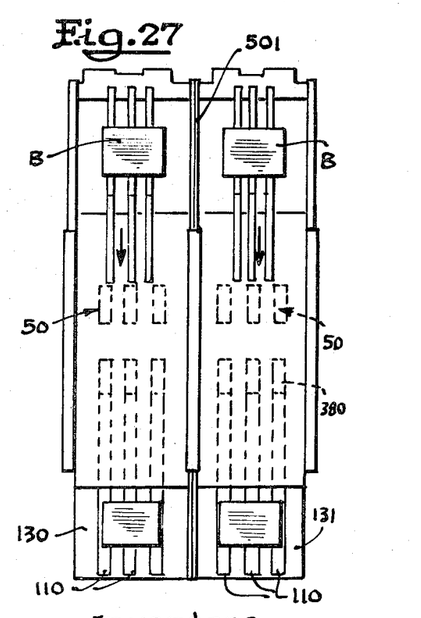
FIG. 27 is a diagrammatic view of another embodiment of the invention wherein two streams of books are being stacked simultaneously.

Another embodiment of the invention, illustrated in FIG. 27, and constructed in accordance with the principles of the hereinbefore described embodiment of the invention, is a stacking machine adapted to receive simultaneously two or more streams of incoming books B. A central divider 501 divides the input conveying portions of the stacking machine so that the books are sent to separate portions of the stacking station to be accumulated in separate and distinct stacks. In the stacking station the stacks are pressed by a patter and are accumulated until the stack is completed whereupon the transfer conveyor mechanism 80 moves the pushers 84 through the stacking station to remove the separate stacks. The separate stacks exist in the stacking station along separate paths afforded by a divider on the table 90.

The present invention is not to be construed as limited to the stacking of only signatures but is applicable to stacking other types of articles or only to stacks of articles having a fixed number of articles therein. One convenient way in which the present invention may be employed is that of stacking envelopes or similar articles which have been previously addressed. In lieu of counting a predetermined number of books, the electrical counter is replaced by a sensing means or scanner to recognize a mark or change in address identification to generate a signal to initiate the removal of a stack having a common identifying mark or address.

When employing the present invention to form stack having a variable number of articles therein, it is preferred that the lowerator 50 be driven downwardly, after the formation of a stack, to the level of the table 90 to avoid the free fall of the stack when removed by the transfer conveyor mechanism 80. After removal of the stack by the transfer conveyor mechanism 80, the lowerator 50 is returned and driven vertically upwardly to its supporting position for the next stack, which will usually vary in thickness from its predecessor stack. Thus, the lowerator 50 is again driven downwardly, after forming of the second-mentioned stack, to the level of the table 90 for removal along the same plane as the first mentioned stack, even though the stacks have different thicknesses.

*Operation*

As an aid to understanding the foregoing, a brief description follows hereinafter.

The stacking machine 25 receives separate and spaced superimposed books in a continuous manner from the trimming machine 27 at the conveyor bands 32 and 33. The conveyor bands 32 and 33 move the books to the inclined support plate 440, FIG. 4, whereupon positive drive fingers 442 on the conveyor chain 444 move the books upwardly into the bight of belts 450 and 451 comprising the conveyor 36.

As can best be understood from FIG. 10, the books leaving the conveyor 36 have sufficient momentum to move forwardly into the stacking station ST to engage the surfaces 212 of a plurality of register bars 210 to the stop and register mechanism 54. The books are supported and accumulated one upon another on the top surface of the lowerator 50.

The incoming books have their backbones expanded and have some air therein from previous forming and cutting operations. To remove the air from the books and generally flatten the books into a neater stack, the patter mechanism 61 is operated periodically to engage the topmost books and drive the now stacked books downwardly against the drag afforded by the electric brake 75 secured at one end of the shaft 74, which has gear 72 in engagement with rack 74 on the lowerator 50.

The operating force for the patter 61 is afforded by spring 62, which urges the cam follower 65 to rotate in a counterclockwise direction as seen in FIG. 10, when permitted to do so by the flat portion 190 of cam 64.

The pressing of the books continues until a predetermined count is reached as determined by an electrical counter (not shown) or as determined by a sensing device which recognizes a predetermined code or other identifying element on the signature. At this time, the stack removal operation is commenced. The patter mechanism 61 is latched against downward movement during a transfer operation by operation of solenoid 101, which pulls in latch block 355, FIGS. 19 and 20, to bring the latch surface 370 beneath the latch pin 356 thereby holding the cam follower 65 against downward movement as permitted by the cam 64 and as urged by the contractile spring 62.

Simultaneous with the latching of the patter mechanism 61, the transfer conveyor mechanism 80 is operated by de-energizing solenoid 245, FIG. 3, to operate clutch mechanism 256, which permits driving engagement between the driving lever arm 312 and driven member 318 thereby clutching a constant rotating input shaft 325 with the driven member 318. The driven member is mounted on the same shaft as the drive sprocket 356 which drives the chain 267, FIG. 1, to turn shaft 259 and thereby chain 360 and shaft 362 on which are disposed driving sprockets 365 for the transfer conveyor chain 82.

The transfer conveyor chain 82 has four sets of combined pushers 84 and temporary book supports 91 which are secured to the transfer chain 82. The surface 88 of the forward-most pusher 84, FIG. 6, engages the front cut edges E of the stack, FIG. 8, to push the stack S from the stacking station and on to table 90 aligned at the height of the lowerator 50 to prevent free fall of the stack as it is being removed.

Simultaneous with the latching operation and operation of the transfer conveyor clutch 256, a solenoid 220, FIG. 12, is operated to lift the register and stop bar mechanism 54 upwardly and rearwardly above the top edge of the stack of books thereby preventing any interferences with the topmost books on the stack. As the stack of books moves past the register bars 210, the solenoid 220 is de-energized whereupon the register bar mechanism 54 drops the register bars 210 downwardly with the rollers 214 engaging the top of the stack and sliding therealong to reposition the register bars 210 to align the edges of the incoming signatures or books, as seen in FIGS. 8 and 9.

As best seen in FIGS. 8 and 9, the temporary book supports 91 extend above the books on stacks and serve as temporary supports for the incoming books or signatures while the stack is being pushed upon the top surface 89, FIGS. 8 and 9, of the table 90.

The pushers 84 on the transfer conveyor move at a relatively slow speed of 10 inches per cycle whereas the input conveyor 36 is discharging signatures of books into the stacking station at the rate of 22 inches per cycle. Thus, approximately three cycles occur before the pushers 84 have cleared the stack by moving the stack through 30 inches to bring the stack on the wide conveyor tapes 110, FIG. 14, which then convey the stack outwardly to engage the vertical stops 112 at the discharge end of the conveyor.

The transfer conveyor mechanism 80 is halted, after having moved through its predetermined amount of movement, by the actuation of limit switches 395 and 396 which cause the energization of an electric brake 330 to exert a stopping force on the transfer conveyor chains 82. Also, the limit switches 295 and 296 cause the de-energization of the solenoid 245, FIG. 3, disengaging the transfer conveyor clutch 256.

The output table 90 is adapted to be raised or lowered to the same level as that of the top surface of the lowerator 50 so that the stack can be moved by the pushers 84 without experiencing any free fall, which might disrupt the stack. Also, the table 90 is tiltable so as to maintain the topmost books of the stack in a generally horizontal position.

From the foregoing, it will be seen that the present invention affords an efficient manner of achieving a flat and compact stack by use of a patter mechanism.

Also the present invention affords a unique conveyor mechanism traveling at a relatively slow rate of speed to remove the stack without disruption of the stack from the stacking station, which is continuing to receive books on a temporary book support. Thus, the stacking machine is continuous in operation.

The output conveyor for moving the books is also adjustable as to its height so that the stack need not experience any free fall. Moreover, the output conveyor mechanism is adapted to be tiltable to maintain the topmost books of the stack in a generally horizontal orientation thereby assuring the removal of the stack without disorientation thereof.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. In a stacking machine for receiving incoming books or the like and stacking the books in a stack at a stacking station, means to convey said books in a seriatium manner to a stacking station, support means to support said books being assembled in a stacked relationship, a presser operated by a spring and periodically operable to engage the uppermost book on the stack and to press thereagainst by the action of said spring, to flatten the incoming books on the stack, a brake exerting a predetermined retarding force on said support means to resist downward movement thereof, said spring exerting sufficient force on said presser to press said support means downwardly against said retarding force, drive means to return said support means after removal of a stack of books therein, and means to remove said stack of books from said stacking station.

2. In a stacking machine for receiving books or the like at a stacking station and arranging the books in a stacked condition and removing the books from the stacking station while in said stacked condition, means for delivering said books into said stacking station at spaced intervals, support means for supporting said books in said stacking station as said books are accumulated, means to remove said books when stacked and operable at a rate slower than said delivery means, and combined temporary book support and stack removing means for temporarily supporting incoming books at spaced intervals while removing said stack of books, the last-named means being in the form of an endless transfer conveyor for removing the stacked books from the stacking station toward a discharge position and including a pusher thereon for engaging one end of the stack and a temporary support element on the endless transfer conveyor positioned above the pusher to support incoming books during transfer of the stack.

3. In a stacking machine having a stacking station receiving books or the like at a predetermined speed and for stacking the books into a stack, said books being removed from said stacking station at a lower speed than said predetermined speed, input conveying means for moving books into said stacking station at said first predetermined speed, support means for supporting said books in a stack at said stacking station, register means adjacent said support means and against which the books are pushed for alignment, means to displace the register means after completion of a stack of books, means for lowering said support means as said books are stacked thereon, and endless conveyor means including a pusher supported thereby to engage said stack and remove said stack from said support means and from said stacking station, said conveyor means being effective to move said stack at a lower speed than the predetermined speed of said incoming books to said stacking station, and said endless conveyor means having secured thereto in position extending above said pusher a temporary book support element movable into said stacking station concurrently with removal of the stack to support incoming books while said stack is being removed.

4. In a stacking machine for stacking books, signatures or the like at a stacking station, input conveying means for conveying said books to said stacking station, support means in said stacking station for supporting said incoming books, pressing means to engage the incoming books and press said books on said support means, and a second conveying means including pushers engaging the stack, said second conveying means including upstanding members having support surfaces thereon to engage and support said books being received while said pushers are removing said stack from said stacking station.

5. In a stacking machine for stacking books, signatures or the like at a stacking station, input conveying means for conveying said books to said stacking station, support means in said stacking station for supporting said incoming books, pressing means to engage the incoming books and to press said books on said support means, stack conveying means having vertical pusher members thereon to engage said stack and push said stack from said stacking station, selectively operable driving means to move said stack conveying means, and support surfaces on said pusher members extending upwardly above the top of said stack to catch incoming books.

6. In a stacking machine for stacking signatures, books or the like in a stacking station, input conveying means for conveying discretely separated books moving in a continuous stream, support means in said stacking station comprising a vertically movable carriage, separated support members secured to said carriage and having supporting surfaces for said books while the books are being stacked on said support surfaces, means for exerting a retarding force to hold said carriage against downward movement, pressing means for engaging and pressing the stack and for moving said carriage downwardly against said retarding force, endless conveying means including pusher elements movable between said support members to push said stack from said support members, and temporary support means carried by said endless conveying means to support said incoming books while said stack is being removed.

7. In a stacking machine having a stacking station for receiving books for stacking the books into a stack, input conveying means for moving books into said stacking station at a predetermined rate of speed, support means for supporting said books in said stacking station, said support means being lowered as said books are stacked thereon, auxiliary support means movable into said stacking station and extending above said first-mentioned support means to receive said incoming books while said stack is being removed, conveyor means supporting said auxiliary support means and effective to engage said stack and remove said stack from said support means and from said stacking station at a slower rate of speed, register stop means for engaging and stopping the movement of said books with their edges aligned as said books are incoming from said input conveying means, and selectively operable means to displace said register stop means to a position removed from said stack to permit the stack to be moved from said stacking station.

8. In a stacking machine readily adjustable to stack a plurality of sizes of books, signatures or the like which are incoming at regular cyclic intervals to said stacking machine, input conveyor means for conveying said books to said stacking station, vertically movable support means in said stacking station to receive said books from said input conveyor means, brake means for exerting a braking force on said vertically movable support means, pressing means to engage and to press said books on said support means and to move said support means against said braking force, latch means to latch said pressing means against operation when said stack is completed, stack conveying means including pusher means movable into and through said stacking station to push said stack from said support means, detachable support members secured to said pusher means and extending above the top of the stack to catch incoming books in said stacking station, stop means to align edges of said stack, means adjustably mounting said stop means to position said stop means at different locations for different sizes of books, and adjustable table means movable to the position opposite that of said lowermost book of said stack of books when the stack is completed.

References Cited

UNITED STATES PATENTS

| | | | |
|---|---|---|---|
| 1,569,033 | 1/1926 | Reichel | 214—6 |
| 2,167,045 | 7/1939 | Hooper | 214—6 |
| 2,205,767 | 6/1940 | Lamb | 214—6 X |
| 2,858,948 | 11/1958 | Kleineberg | 271—88 X |
| 2,917,991 | 12/1959 | Segur | 214—6 |
| 3,059,789 | 10/1962 | Bowles | 214—41 |
| 3,150,578 | 9/1964 | Dale et al. | 214—6 |

ROBERT G. SHERIDAN, *Primary Examiner.*

R. J. SPAR, *Assistant Examiner.*